(12) United States Patent
Cyrankiewicz et al.

(10) Patent No.: US 7,319,856 B1
(45) Date of Patent: Jan. 15, 2008

(54) METHOD FOR THE SELECTION, TRANSMISSION AND PLAYBACK OF PIECES OF MUSIC BY SUBSCRIBERS A DIGITAL MOBILE COMMUNICATION NETWORK

(75) Inventors: Arthur Cyrankiewicz, Munster (DE); Uwe Michel, Bad Honnef (DE)

(73) Assignee: T-Mobile Deutschland GmbH, Bonn (DE)

( * ) Notice: Subject to any disclaimer, the term of this patent is extended or adjusted under 35 U.S.C. 154(b) by 634 days.

(21) Appl. No.: 10/110,490

(22) PCT Filed: Oct. 13, 2000

(86) PCT No.: PCT/DE00/03614

§ 371 (c)(1),
(2), (4) Date: Sep. 4, 2002

(87) PCT Pub. No.: WO01/28183

PCT Pub. Date: Apr. 19, 2001

(30) Foreign Application Priority Data

Oct. 15, 1999 (DE) ................................ 199 50 001

(51) Int. Cl.
*H04M 1/66* (2006.01)
(52) U.S. Cl. ................... 455/411; 455/419; 455/414.1; 713/176
(58) Field of Classification Search ............... 455/419, 455/414.1, 414.3, 414.4, 66.1; 713/176
See application file for complete search history.

(56) References Cited

U.S. PATENT DOCUMENTS

| 5,742,893 A | * | 4/1998 | Frank | 455/66.1 |
| 6,728,531 B1 | * | 4/2004 | Lee et al. | 455/419 |
| 2004/0128514 A1 | * | 7/2004 | Rhoads | 713/176 |

FOREIGN PATENT DOCUMENTS

| DE | 19841541 | 6/1999 |
| DE | 19805409 | 8/1999 |
| EP | 0851649 | 7/1998 |
| JP | 11-007290 | 1/1999 |
| JP | 11-164058 | 6/1999 |
| WO | WO97/26601 | 7/1997 |

* cited by examiner

*Primary Examiner*—Jean Gelin
*Assistant Examiner*—Phuoc Doan
(74) *Attorney, Agent, or Firm*—Cooper & Dunham LLP

(57) ABSTRACT

The invention relates to a method for the selection, transmission and playback of pieces of music by subscribers of a digital mobile network, whereby a plurality of pieces of music is saved in digital form on a database server. The inventive device is characterised in that the database server is dialled up by a mobile terminal via the mobile communication network and a desired piece of music is selected. The selected piece of music is then transmitted in the form of digital audio data from the database server to the mobile terminal via the mobile communication network and is played back on the mobile terminal. The invention also relates to a mobile radio terminal which is suitable for carrying out said method.

18 Claims, 2 Drawing Sheets

Figure 1:
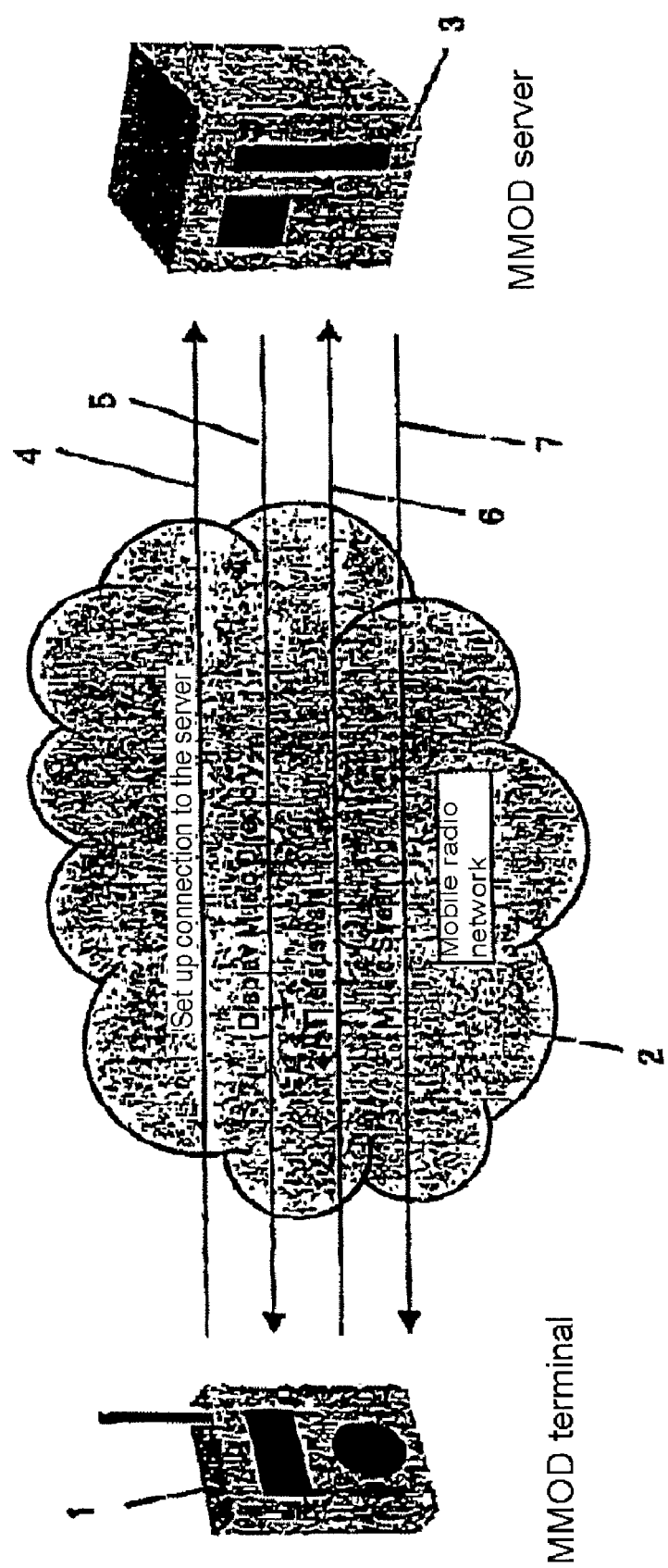

METHOD FOR THE SELECTION, TRANSMISSION AND PLAYBACK OF PIECES OF MUSIC BY SUBSCRIBERS A DIGITAL MOBILE COMMUNICATION NETWORK

The invention relates to a method for choosing, for transmitting and for playing back pieces of music by subscribers to a digital mobile communications system, with a large number of pieces of music being stored in digital form in a databank server.

These so-called music on demand systems and providers are already known in the landline-based Internet, that is to say servers exist from which any desired music titles can be loaded by means of Internet technologies by Internet subscribers into a personal computer, where they can be played back, or can be transmitted to a separate terminal, a so-called MP3 player, where they can be played back.

The already known systems have the disadvantage that a PC with Internet access is required in order to allow access to the databank server. When using MP3 players, the PC is required for temporary storage of the audio data and for transmission to the MP3 player. Furthermore, due to the necessity for a PC, access to the server is not possible at any time and from any location.

Patent Abstracts of Japan, Vol. 1999, No. 11, & JP 11161058 A disclose a method and system for choosing, for transmitting and for playing back pieces of music by subscribers to a digital mobile communications system, with a large number of pieces of music being stored in digital form in a databank server, the databank server being selected by a mobile terminal via the mobile communications system and a desired piece of music being chosen, and the chosen piece of music being transmitted in the form of digital audio data from the databank server via the mobile communications system to the mobile terminal, where it is played back.

The object of the invention is to propose a method which allows the subscribers to a mobile radio network to easily choose and play back pieces of music via their mobile terminal, using supporting functions of the mobile radio network.

According to the invention this object is achieved by the features specified in the independent patent claims.

The invention is based on the databank being selected by a mobile terminal via the mobile communications system and on a desired piece of music being chosen, with the chosen piece of music being transmitted from the databank via the mobile communications system to the mobile terminal, where it is played back.

In the refinement as claimed in claim 1, the databank server is included in the infrastructure of the mobile communications system, and can be selected by the subscriber using an associated address or telephone number. The mobile communications system provides unique subscriber identification/authentication for access to the databank server, with the charges for use of the databank server likewise being invoiced via the mobile communications system.

The refinement as claimed in claim 2 provides for the databank server to be included in the infrastructure of the Internet and for the capability for it to be addressed by the subscriber using an associated IP address. This makes it necessary to have direct access from the mobile communications system into the Internet. The subscriber on the mobile terminal is allocated a temporary IP address (IP: Internet Protocol) for use of the databank server, with the IP address being linked to the subscriber identity. The subscriber identity and the IP address linked to it can be used for unique subscriber identification/authentication for access to the databank server through the mobile communications system. In this case, the IP source address is used by the databank server as the basis for checking the access authorization of the subscriber. In this case as well, charges for use of the databank server are invoiced via the mobile communications system.

A terminal which combines the functions of a mobile terminal (for example a GSM mobile telephone) with the functions of a Walkman/Discman is referred to in the following text as a mobile music on demand terminal (MMOD terminal), and offers the following advantages:

Compared to a Walkman, for example, the MMOD terminal allows spontaneous access to a repertoire of music titles of any desired size and is not restricted to a data storage medium (cassette, CD) with a limited music repertoire. In contrast to the present-day MP3 players, no additional PC with Internet access is required in order to allow access to the databank server (MMOD server). There is no need to temporarily store the audio data in a PC, and to transmit it to the MP3 player.

The MMOD system according to the invention is operated using the mobile radio network, which acts as a transport network for the music data and, in the process, offers supporting functions (subscriber identification, charging functions). An MMOD system has the following advantages over the present-day prior art.

The mobile radio network offers unique subscriber identification/authentication as a supporting function for the MMOD server. This means that there is no need for the r to additionally log in (user name/password) with the MMOD server. The subscriber authentication is an important precondition for the ability for charging for an MMOD service, and for personalization of the music offered. The MMOD server is accessed while mobile, that is to say at any time and from any location where the necessary radio supply is available.

One preferred embodiment of the invention provides for the piece of music—in a similar way to that in the case of a music box—to be played back immediately in the terminal. However, it is also possible to provide for the piece of music to be stored in the terminal, and to be played back at any desired later time.

In order to keep the transmission times short and to utilize the limited transmission bandwidth of present-day mobile radio networks, the audio data is transmitted in compressed form.

The subscriber can thus use the terminal man-machine interface (MMI) to choose the title or titles to be played back subsequently, and transmits his choice via the mobile communications system to the databank server.

Since the use of the service is linked to a subscriber identity makes it possible for the user to be offered a personalized list of music, from which he can choose the desired music titles.

The mobile radio terminal for use of the service includes the functions of a mobile terminal and the functions of a playback appliance for pieces of music which are available in digital form. The terminal has suitable browser software, in which the URL or the direct IP address of the server to be selected is stored.

Figure 2:
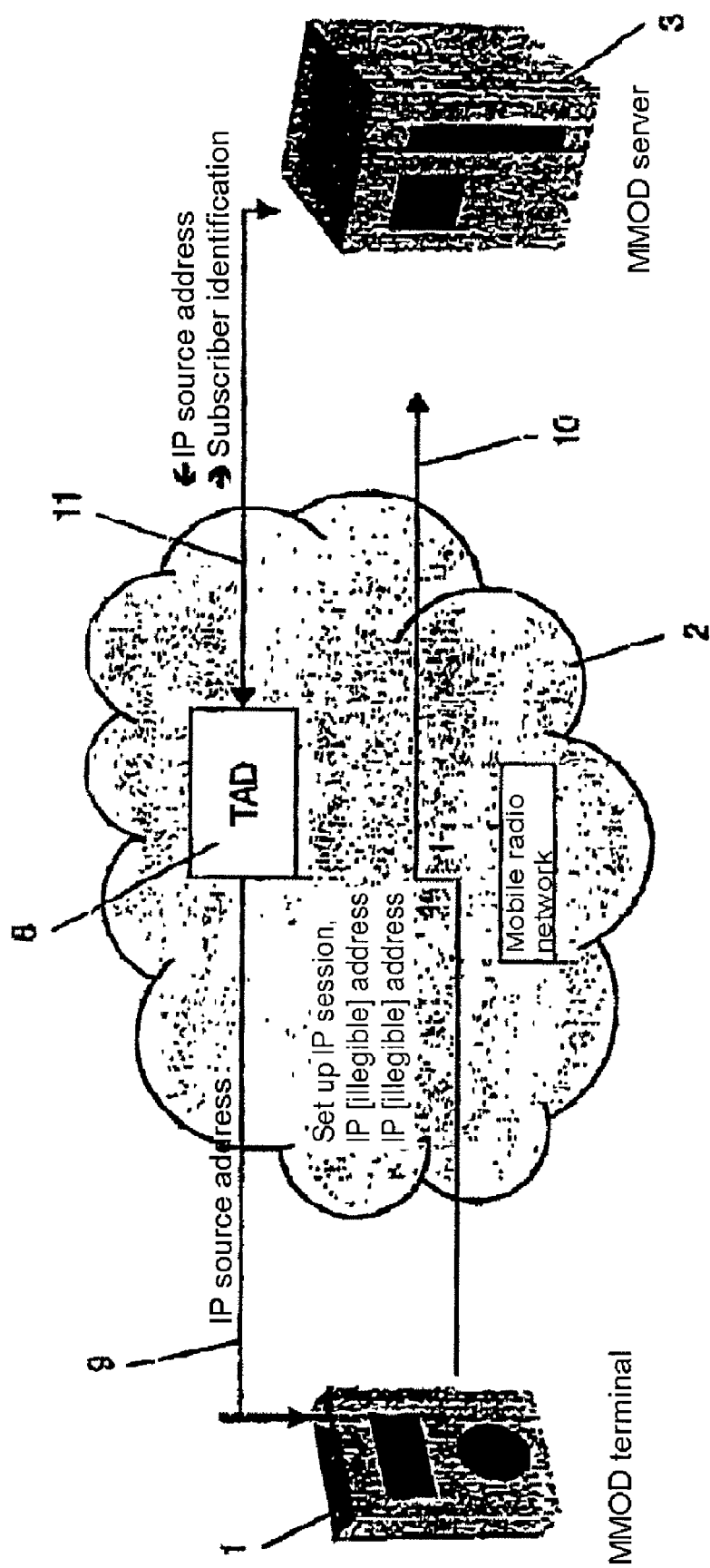

The invention will be explained in more detail in the following text using an exemplary embodiment and with reference to the following figures. Further features and advantages of the invention will become evident from the drawings and from their description, and in which:

FIG. 1: shows the basic infrastructure for carrying out the method according to the invention;

FIG. 2: illustrates the message flow when setting up a connection and for the allocation of the IP addresses.

As shown in FIG. 1, the overall infrastructure of the MMOD system according to the invention essentially comprises the MMOD-compatible mobile terminal 1, a mobile radio network 2 and an MMOD databank server 3.

A connection is set up between the terminal 1 and the databank server 3 as follows. Once the terminal 1 has been switched on and has been registered in the mobile radio network 2, it sets up a data connection 4, either automatically or initiated by the mobile radio subscriber, to a chosen databank server 3. In principle, it is possible to address a large number of databank servers having music titles which can be called up.

The MMOD terminal 1 includes an MMOD browser, similar to the present-day known Internet-www-Browser, in which the URL (Unified Resource Locator, as a representative of an IP destination address) or the direct IP address of the server 3 to be selected is stored. After self-starting the browser, an end-to-end IP session is set up between the terminal 1 and the server 3. The URL or IP destination address of the server 3 can be configured by the user, by means of the terminal MMI (man-machine interface).

The MMOD server 3 is freely available in the Internet. The mobile radio network 2 in this scenario accordingly has a direct gateway into the Internet. The connection for the Internet may be produced, for example, in a known manner using the Wireless Application Protocol (WAP). The mobile radio network operator in this case acts as the Internet Service Provider (ISP). As an alternative to this, scenarios are also feasible in which an already existing Internet Service Provider provides the gateway into the Internet, on behalf of the mobile network operator. For simplicity, it is assumed in the following text that the mobile network operator himself acts as the ISP.

As shown in FIG. 2, when setting up a connection, an IP source address is allocated to the MMOD terminal 1 from the range of the mobile network operator (item 9). This IP source address is transmitted to the databank server 3 (item 10) and is then used by the MMOD server 3 as the basis for checking whether the subscriber is authorized for access to the databank server 3. Since the IP source address is distributed dynamically by the mobile network operator/ISP (from now on referred to as the mobile ISP), the mobile ISP controls the relationship between the IP address and the subscriber identity. This relationship is stored in an appropriate databank 8 TAD in the mobile network 2 (subscriber/IP address databank: TAD), which can be checked by the MMOD server 3.

In the illustrated scenario, it is assumed that subscriber administration and the administration of associated authorizations are carried out in the MMOD server 3. The mobile network 2 in this case supports the process of subscriber identification/authentication by the secure subscriber identity/identification being provided on request from the TAD databank 8 to the MMOD server 3 on the basis of the IP address (see item 11). This is of interest in particular in those mobile radio networks which already carry out implicit authentication of terminals (for example the GSM) and which can thus identify the subscriber uniquely.

As an alternative to this, authentication parameters (user names/password) can also be administered in the MMOD server 3. In this case, a login procedure takes place between the terminal 1 and the server 3, instead of checking the TAD databank 8 in the mobile radio network 2. In this case login data (user name/password) is entered by the subscriber in the terminal, and is also transmitted to the MMOD server 3 when setting up a connection.

Once the IP session has been set up between the terminal 1 and the server 3, the mobile radio network 2 now acts only as a pure transport network for the control and music data. The rest of the communication flow takes place directly between the applications in the terminal 1 and the server 3.

Once the identity of the subscriber has been confirmed by the MMOD server in the course of setting up a connection, the user is now offered, as shown in FIG. 1, a personalized music directory (item 5), from which he can then choose the desired titles. The subscriber is provided with the capability to match the music directory display (that is to say the contents list of music titles which can be called up) on the terminal 1 to his own wishes. To do this, the subscriber is offered, for example, an appropriate www page in the Internet, which allows him to make the necessary settings and to store his own profile on the MMOD server 3. The personalization of the music directory provides the subscriber with the desired user interface on the terminal 1.

The subscriber uses the terminal MMI to choose from the displayed list of music titles the title or titles to be played back subsequently, and transmits these titles to the MMOD server (item 6).

The chosen music titles are transmitted, for example using the streaming method, from the MMOD server 3 via the mobile radio network 2 to the terminal 1 (item 7), and are preferably played back immediately by the terminal 1. As an alternative to this, the loaded audio data can also be temporarily stored in the terminal 1, or at least can be buffered, in order to compensate for any transmission bottlenecks in mobile radio networks, and also in order to listen to the pieces of music deliberately later on.

In order to achieve an acceptable audio quality with the limited transmission bandwidth of present-day mobile radio networks, the audio data must be appropriately compressed. The conventional methods are currently MP3 or RealAudio.

DRAWING LEGEND

1 MMOD terminal
2 Mobile radio network
3 MMOD databank server
4 Setting up a connection
5 Music directory display
6 Title choice
7 Music data transmission
8 TAD (subscriber/IP address databank)
9 Data transmission
10 Data transmission
11 Data transmission

The invention claimed is:

1. A method for choosing, for transmitting and for playing back pieces of music by subscribers to a digital mobile communications system, comprising:
   storing a large number of pieces of music in digital form in a databank server;
   providing a system allowing a subscriber to modify settings and to store a subscriber profile on the databank server;
   selecting the databank server by a mobile terminal via the mobile communications system, the databank server being included in the infrastructure of the mobile communications system and being selected by the subscriber using an associated telephone number;
   choosing a desired piece of music;

transmitting the chosen piece of music in the form of digital audio data from the databank server via the mobile communications system to the mobile terminal where it is played back;

providing a unique subscriber identification/authentication for access to the databank server through the mobile communications system, the mobile communications system acting as a pure transport network for the digital audio data; and charging for use of the databank server via the mobile communications system.

2. The method as claimed in claim 1, wherein the piece of music is played back immediately in the terminal.

3. The method as claimed in claim 1, wherein the piece of music is stored in the terminal, and can be played back at any desired later time.

4. The method as claimed in claim 1, wherein the audio data is transmitted in compressed from.

5. The method as claimed in claim 1, further comprising using an interface of the terminal to choose the piece of music to be played back subsequently, and transmitting the choice via the mobile communications system to the databank server.

6. The method as claimed in claim 1, wherein the subscriber is offered a personalized list of music based on their subscriber profile, from which the subscriber can choose the desired music.

7. A method for choosing, for transmitting and for playing back pieces of music by subscribers to a digital mobile communications system, comprising:

storing a large number of pieces of music in digital form in a databank server;

providing a system allowing a subscriber to modify settings and to store a subscriber profile on the databank server;

selecting the databank server by a mobile terminal via the mobile communications system, the mobile communications system having a direct gateway into the Internet, the databank server being included in the infrastructure of the Internet, and being addressable by the subscriber using an associated Internet protocol address;

choosing a desired piece of music;

transmitting the chosen piece of music in the form of digital audio data from the databank server via the mobile communications system to the mobile terminal where it is played back;

allocating the subscriber or the mobile terminal a temporary Internet protocol address for use of the databank server, with the Internet protocol address being linked to the subscriber identity;

using the Internet protocol source address by the databank server as the basis for checking the access authorization of the subscriber, the mobile communications system acting as a pure transport network for the digital audio data; and charging for use of the databank server via the mobile communications system.

8. The method as claimed in claim 7, wherein the piece of music is played back immediately in the terminal.

9. The method as claimed in claim 7, wherein the piece of music is stored in the terminal, and can be played back at any desired later time.

10. The method as claimed in claim 7, wherein the audio data is transmitted in compressed from.

11. The method as claimed in claim 7, further comprising using an interface of the terminal to choose the piece of music to be played back subsequently, and transmitting the choice via the mobile communications system to the databank server.

12. The method as claimed in claim 7, wherein the subscriber is offered a personalized list of music based on their subscriber profile, from which the subscriber can choose the desired music.

13. A mobile radio terminal for carrying out the method as claimed in claim 1, said mobile radio terminal having the functions of a mobile terminal and the functions of a playback appliance for pieces of music which are available in digital form.

14. The mobile radio terminal as claimed in claim 13, wherein said mobile radio terminal includes suitable browser software, in which the URL or the direct Internet protocol address of the databank server to be selected is stored.

15. A mobile radio terminal for carrying out the method as claimed in claim 7, said mobile radio terminal having the functions of a mobile terminal and the functions of a playback appliance for pieces of music which are available in digital form.

16. The mobile radio terminal as claimed in claim 7, wherein said mobile radio terminal includes suitable browser software, in which the URL or the direct Internet protocol address of the databank server to be selected is stored.

17. A mobile radio terminal for carrying out a method for choosing, for transmitting and for playing back pieces of music by subscribers to a digital mobile communications system, said mobile radio terminal having the functions of a mobile terminal and the functions of a playback appliance for pieces of music which are available in digital form, said method for choosing, for transmitting and for playing back pieces of music by subscribers to a digital mobile communications system, comprising:

storing a large number of pieces of music in digital form in a databank server;

providing a system allowing a subscriber to modify settings and to store a subscriber profile on the databank server;

selecting the databank server by a mobile terminal via the mobile communications system, the databank server being included in the infrastructure of the mobile communications system and being selected by the subscriber using an associated telephone number;

choosing a desired piece of music;

transmitting the chosen piece of music in the form of digital audio data from the databank server via the mobile communications system to the mobile terminal where it is played back;

providing a unique subscriber identification/authentication for access to the databank server through the mobile communications system, the mobile communications system acting as a pure transport network for the digital audio data; and charging for use of the databank server via the mobile communications system.

18. A mobile radio terminal for carrying out a method for choosing, for transmitting and for playing back pieces of music by subscribers to a digital mobile communications system, said mobile radio terminal having the functions of a mobile terminal and the functions of a playback appliance for pieces of music which are available in digital form, said method for choosing, for transmitting and for playing back pieces of music by subscribers to a digital mobile communications system, comprising:

storing a large number of pieces of music in digital form in a databank server;

providing a system allowing a subscriber to modify settings and to store a subscriber profile on the databank server;

selecting the databank server by a mobile terminal via the mobile communications system, the mobile communications system having a direct gateway into the Internet, the databank server being included in the infrastructure of the Internet, and being addressable by the subscriber using an associated Internet protocol address; (c) choosing a desired piece of music;

transmitting the chosen piece of music in the form of digital audio data from the databank server via the mobile communications system to the mobile terminal where it is played back;

allocating the subscriber or the mobile terminal a temporary Internet protocol address for use of the databank server, with the Internet protocol address being linked to the subscriber identity;

using the Internet protocol source address by the databank server as the basis for checking the access authorization of the subscriber, the mobile communications system acting as a pure transport network for the digital audio data; and charging for use of the databank server via the mobile communications system.

* * * * *